United States Patent [19]

Nozaki

[11] Patent Number: 5,693,419
[45] Date of Patent: Dec. 2, 1997

[54] WEATHER STRIP FOR MOTOR VEHICLE

[75] Inventor: Masahiro Nozaki, Tsushima, Japan

[73] Assignee: Toyoda Gosei Co., Ltd., Aichi-ken, Japan

[21] Appl. No.: 603,233

[22] Filed: Feb. 20, 1996

[30] Foreign Application Priority Data

Feb. 20, 1995 [JP] Japan .................................. 7-056627

[51] Int. Cl.[6] .................................................. B60J 10/08
[52] U.S. Cl. .......................... 428/354; 49/479.1; 49/498.1; 296/93
[58] Field of Search .................... 428/31, 354; 49/479.1, 49/498.1, 475.1; 296/93

[56] References Cited

U.S. PATENT DOCUMENTS 5,466,508  11/1995  Brocke et al. ...................... 49/498.1

*Primary Examiner*—Alexander Thomas
*Attorney, Agent, or Firm*—Cushman Darby & Cushman IP Group of Pillsbury Madison & Sutro LLP

[57] ABSTRACT

A weather strip adapted to be continuously attached to a body panel around door openings of motor vehicles, which extends from a front pillar to a quarter pillar by way of a side face of a roof. The weather strip includes a base portion of solid rubber, a seal portion of sponge rubber and a molding portion of solid rubber, which is continuously formed along an outside end of the base portion. The width of the molding portion gradually varies such that its front part has a first width capable of covering substantially an entire outside face of the seal portion, its rear corner part has a width gradually reducing towards the quarter pillar and its rear part has a width less than the first width to prevent interference with a rear edge of a rear door window glass or rear door frame upon opening and closing of a rear door. The weather strip thus constructed is produced by extrusion.

5 Claims, 2 Drawing Sheets

WEATHER STRIP FOR MOTOR VEHICLE

The priority application, Japanese Patent Application No. Hoi 7-056627, filed in Japan on Feb. 20, 1995, is hereby incorporated by reference into the present specification.

BACKGROUND OF THE INVENTION

1. Field of the Invention

The present invention relates to weather strips for motor vehicles, and, more particularly, to a weather strip to be attached to a body panel around door openings, which extends from a front pillar to a quarter pillar by way of a side face of a roof of a motor vehicle.

2. Description of Related Art

As shown in FIG. 1, a weather strip 10 is continuously attached to a body panel around door openings. The weather strip 10 extends from a front pillar 12 to a quarter pillar 16 by way of a side face 14 of a roof of a vehicle body.

FIG. 2 illustrates one example of such a weather strip. As shown, the weather strip 10 has a base portion 18 and a seal portion 20 defining a tubular portion. The base portion 18 is attached to a body panel 22 defining door openings. Upon closing of front and rear door window glasses 24, peripheral edges thereof push against the seal portion 20. The weather strip 10 thus constructed is generally attached to the body panel 22 with a retainer. Alternatively, as shown in FIG. 2, the weather strip may be attached with a double-sided adhesive tape 26.

Normally, a roof molding 28 is continuously secured to the side face 14 of the roof to cover the weather strip 10 as disclosed in Japanese Utility Model Application laid-open No. Hei 1-112110.

If the roof molding 28 has a width capable of covering an outside face of the weather strip 10 over the entire length thereof, the door window glass 24 does not interfere with a front part of the roof molding 28 along the front pillar 12 and the side face 14 of the roof, but, upon the closing and opening of a rear door, a rear edge of the door window glass 24 interferes with the roof molding 28 along the quarter pillar 16. To overcome this problem, another narrow roof molding has been separately prepared and secured along the quarter pillar 16, or the roof molding has been made narrow over the entire length thereof. In the latter case, however, a substantial part of the seal portion of the weather strip is exposed from the narrow roof molding, which exhibits an undesirable poor appearance.

Furthermore, to separately prepare a long roof molding and secure it along the side face of the roof by welding or the like, as shown in FIG. 2, productivity is low and production costs increase.

SUMMARY OF THE INVENTION

Accordingly, it is an object of the present invention to provide a weather strip integrally provided with a molding portion capable of covering a seal portion thereof and preventing interference with a door window glass or door frame along a quarter pillar, which can be produced at low costs, and which has a good appearance.

The weather strip of the present invention is integrally provided with a base portion to be attached to a body panel around door openings of a motor vehicle, which extends from a front pillar to a quarter pillar by way of a side face of a roof, a seal portion defining a tubular portion with the base portion, and a molding portion formed along an outside end of the base portion to cover an outside face of the seal portion. The base portion and the molding portion are integrally composed of solid rubber, and the seal portion is composed of sponge rubber. A front part of the molding portion along the front pillar and the side face of the roof has a width capable of covering substantially an entire outside face of the seal portion. A rear corner part of the molding portion along a rear corner between the side face of the roof and the quarter pillar has a width gradually reducing towards the quarter pillar. A rear part of the molding portion along the quarter pillar has a reduced width which does not cause interference with a rear edge of a rear door window glass or rear door frame upon the opening and closing of a rear door.

The weather strip provided with the molding portion is produced by extrusion. During extrusion, the width of the molding portion is partly varied by using an extruder capable of varying the shape of an extruding opening, for example.

Alternatively, the molding portion of the weather strip which is fed continuously from an extruder, is partly cut-off with a cutter which is provided downstream of an extruding opening of the extruder so as to slide towards an end of the molding portion.

It is desirable that the molding portion extruded has a triangular cross-section of which the thickness gradually decreases towards a protruding end thereof, and that the weather strip is attached with a double-sided adhesive tape.

With the weather strip in accordance with the present invention, the front part of the molding portion along the front pillar and the side face of the roof covers the weather strip, and the rear part of the molding portion along the quarter pillar does not interfere with the rear door window glass or rear door frame. The weather strip integrally provided with the molding portion can be readily attached to the body panel around door openings with a double-sided adhesive tape.

DETAILED DESCRIPTION OF THE PRESENTLY PREFERRED EXEMPLARY EMBODIMENT

Figure 1:
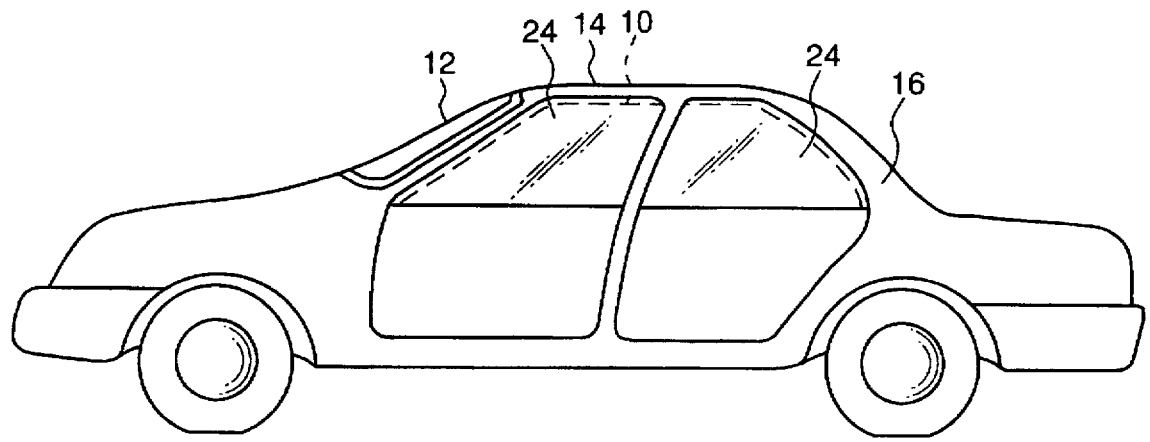
FIG. 1 is a side elevational view of a conventional motor vehicle to which the weather strip of the present invention is applied.
Figure 2:
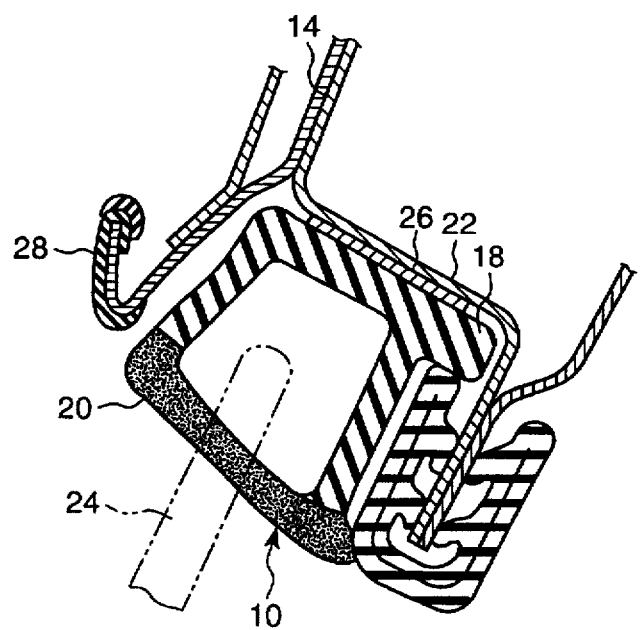
FIG. 2 is a cross-sectional view illustrating the attached state of a conventional weather strip.
Figure 3:
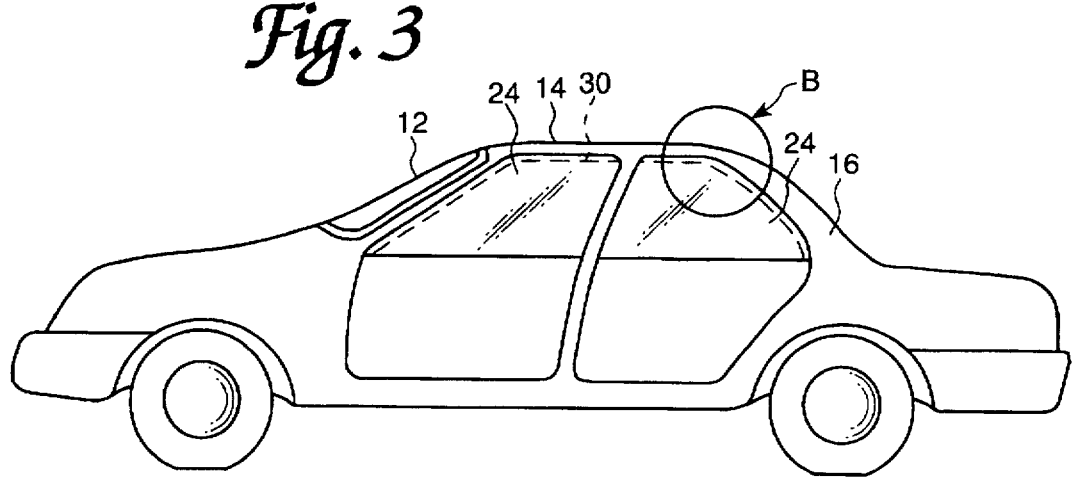
FIG. 3 is a side elevational view of a motor vehicle provided with one embodiment of a weather strip in accordance with the present invention.
Figure 4:
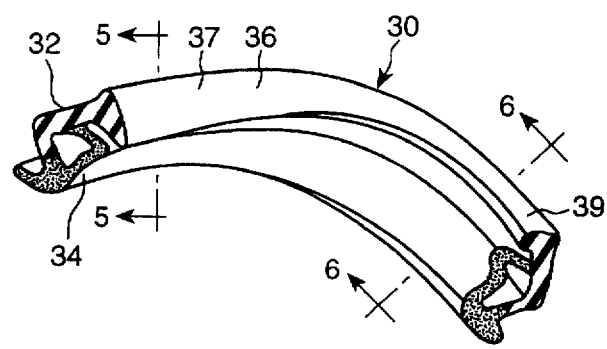
FIG. 4 is a perspective view of one part of a weather strip, which is denoted by circle B in FIG. 3.
Figure 5:
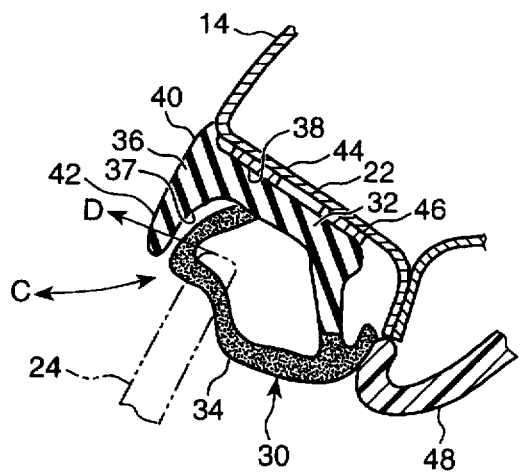
FIG. 5 is a cross-sectional view illustrating the attached state of the weather strip, taken along a line 5—5 of FIG. 4.

FIG. 4 illustrates a rear corner part of one embodiment of a weather strip in accordance with the present invention, which is denoted by circle B in FIG. 3. A weather strip 30 is an integrally extruded body provided with a base portion 32 composed of solid rubber, a seal portion 34 coupled to the base portion 32 and composed of sponge rubber, and a molding portion 36 composed of solid rubber. As shown in FIG. 3, the weather strip 30 is continuously attached to a body panel around door openings along a front pillar 12, a side face 14 of a roof and a quarter pillar 16 over the entire length thereof. The base portion 32 and the seal portion 34 define a tubular portion. As shown in FIG. 5, when a door is closed, the seal portion 34 is pushed-up by a peripheral edge of a door window glass 24 or door frame.

The molding portion 36 protrudes toward the seal portion 34 from an outside end of the base portion 32. A front part 37 of the molding portion 36 along the front pillar 12 and the side face 14 of the roof has a triangular cross-section. A bottom surface of the base portion 32 extends outwardly to act as a bottom surface of the molding portion 36. In the attached state of the weather strip 30 (FIG. 5), an outside face 40 of the molding portion 36 is generally flush with the side face 14 of the roof. An inside face 42 of the molding portion 36 faces an outside face of the seal portion 24 with a small space therebetween. A protruding end of the molding portion 36 is located near a lower end of the outside face of the seal portion 34.

Figure 6:
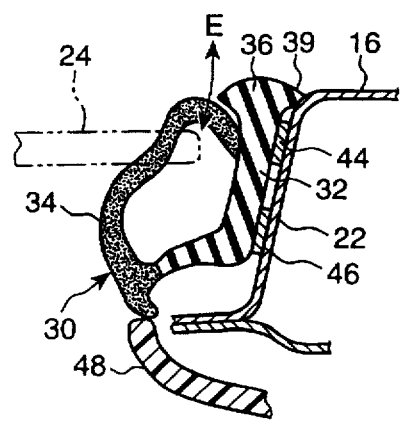
FIG. 6 is a cross-sectional view illustrating the attached state of the weather strip, taken along a line 6—6 of FIG. A.

Along the rear corner of the body panel between the side face 14 of the roof and the quarter pillar 16, the width of the molding portion 36 gradually reduces toward the quarter pillar 16 such that the protruding end is gradually removed from the molding portion 36. As a result, as shown in FIG. 6, a rear part 39 of the molding portion 36 along the quarter pillar 16 has a substantially trapezoidal cross-section. The width thereof is slightly greater than the thickness of the base portion 32.

The weather strip 30 thus constructed is obtained by extrusion by an extruder. To vary the width of the molding portion, the extruder is provided with a lid capable of closing and opening one part of an extruding opening. The movement of the lid is controlled in accordance with the extruding speed of the weather strip. More specifically, the lid moves to open an end edge of the extruding opening while a front part of the weather strip, which will be attached along the front pillar and the side face of the roof of a vehicle body, passes the extruding opening. The lid moves to close the end edge of the extruding opening for reducing the width of the molding portion while a rear corner part and rear part of the weather strip, which will be attached along the rear corner and quarter pillar of the vehicle body, pass the extruding opening.

Alternatively, to vary the width of the molding portion, a cutter capable of cutting-off an end edge of the molding portion continuously extruded by the extruder may be provided. This cutter is located downstream of an extruding opening of an extruder so as to retract from and project to the molding portion of the extruded weather strip. The movement of the cutter is controlled in accordance with the extruding speed of the weather strip. More specifically, the cutter retracts while a front part of the weather strip, which will be attached along the front pillar and the side face of the roof of a vehicle body, passes the cutter, and projects to cut-off the end edge of the molding portion while a rear corner part and a rear part of the weather strip, which will be attached along the rear corner and quarter pillar of the vehicle body, pass the cutter.

The weather strip 30 thus obtained can be readily attached by first bonding double-sided adhesive tapes 44 and 46 to outer and inner parts of the bottom surface of the base portion 32, and pressing the base portion 32 on the body panel 22 around the door openings. Alternatively, one double-sided adhesive tape will do. In the drawing, reference numeral 48 denotes a garnish adapted to cover a ceiling face within a vehicle compartment.

As shown in FIG. 5, the protruding end of the front part 37 of the molding portion 36 along the front pillar 12 and the side face 14 of the roof is located near the lower end of the outside face of the seal portion 34, but, upon the opening and closing of front and rear doors, the peripheral edges of the door window glass 24 do not interfere with the protruding end of the front part 37 of the molding portion 36, because, at this time, the peripheral edges of the door window glass 24 move in the directions shown by arrows C. As shown in FIG. 6, upon the closing and opening of a rear door, a rear edge of the door window glass 24 of the rear door moves in the directions shown by arrows E, but, the rear edge of the door window glass 24 does not interfere with the molding portion 36, because the width of the rear part 39 of the molding portion 38 along the quarter pillar 16 is narrower than that of the front part 37 of the molding portion.

During high-speed travel of motor vehicles, the upper part of the door window glass 24 tends to be drawn in the direction of arrow D shown in FIG. 5. With the present embodiment, the door window glass 24 drawn outwardly will interfere with the protruding end of the molding portion 36, thereby preventing the door window glass 24 from being drawn further outwardly.

The weather strip 30 thus constructed can be attached easily with a double-sided adhesive tape.

With the present invention, since the molding portion is formed integrally with the weather strip, a roof molding is provided around door openings upon the attachment of the weather strip to a vehicle body.

Furthermore, since the molding portion continues along door openings, the appearance around side doors of motor vehicles is improved. And since the rear part of the molding portion along the quarter pillar has a reduced width, upon opening and closing of a rear door, the rear door window glass or rear door frame does not interfere with the rear part of the molding portion. In addition, the weather strip in accordance with the present invention can be readily produced by extrusion to improve productivity, and can be easily bonded to a vehicle body with a double-sided adhesive tape.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip adapted to be attached to a body panel around door openings of a motor vehicle, the weather strip being constructed and arranged to extend from a front pillar to a quarter pillar of the vehicle by way of a side face of a roof portion of the vehicle, the weather strip comprising:

a base portion composed of solid rubber, which is adapted to be attached to the body panel;

a seal portion coupled to said base portion and composed of sponge rubber, said seal portion being adapted to be pushed by one of the peripheral edges of a door window pane and a door frame upon closing of a vehicle door; and a molding portion coupled to said base portion and composed of solid rubber, said molding portion being disposed along an outside end of said base portion so as to cover at least a portion of an outside face of said seal portion, said molding portion having a gradually varying width, a front part of said molding portion constructed and arranged to be disposed along the front pillar and the side face of the roof having a first width sized to cover substantially an entire outside face of said seal portion, a rear corner part of said molding portion constructed and arranged to be disposed along a rear corner of the body panel between the side face of the roof and the quarter pillar having a width gradually reducing towards the quarter pillar, and a rear part of said molding portion constructed and arranged to be disposed along the quarter pillar having a width less than said first width so as to prevent interference of the molding portion with a rear edge of one of the rear door window glass and the rear door frame upon opening and closing of a rear door of the vehicle.

2. The weather strip according to claim 1, wherein said molding portion protrudes along an outside face of said seal portion from an outside end of said base portion, and a thickness of the molding portion gradually decreases towards a protruding end thereof, so as to have a generally triangular cross-section.

3. The weather strip according to claim 2, wherein said front part of said molding portion has a generally triangular cross-section, and said rear part of said molding portion has a generally trapezoidal cross-section, which is obtained by removing the protruding end from said triangular cross-section.

4. The weather strip according to claim 1, further including a double-sided adhesive tape bonded to a bottom face of said base portion for bonding said base portion to the body panel around the door openings.

5. The weather strip according to claim 1, wherein said molding portion, for at least a portion of the length thereof, is spaced from said outside face of said seal portion along the portion covered thereby.

* * * * *